(12) United States Patent
Drunert (10) Patent No.: US 7,781,117 B2
(45) Date of Patent: Aug. 24, 2010

(54) FUEL CELL STACK PREHEATING

(75) Inventor: Volker Drunert, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 900 days.

(21) Appl. No.: 10/407,072

(22) Filed: Apr. 3, 2003

(65) Prior Publication Data

US 2004/0197610 A1    Oct. 7, 2004

(51) Int. Cl.
*H01M 8/04* (2006.01)
(52) U.S. Cl. .................. 429/444; 429/428; 429/433; 429/442; 429/443; 429/447
(58) Field of Classification Search .................. 429/13, 429/17, 24
See application file for complete search history.

(56) References Cited

U.S. PATENT DOCUMENTS 6,103,410 A * 8/2000 Fuller et al. ................... 429/13
6,358,638 B1 * 3/2002 Rock et al. .................... 429/13
6,887,598 B2 * 5/2005 Thompson et al. ............ 429/13

* cited by examiner

*Primary Examiner*—Jonathan Crepeau
*Assistant Examiner*—Tony Chuo
(74) *Attorney, Agent, or Firm*—Harness, Dickey & Pierce, P.L.C.

(57) ABSTRACT

A fuel cell system includes a fuel cell and a controller that controls a hydrocarbon fuel supply to an anode side and a cathode side of the fuel cell. The controller controls an oxidant supply to the anode and cathode sides to exothermically react with the hydrocarbon fuel when a temperature of the fuel cell is below a threshold temperature. When the temperature is greater than the threshold temperature, the controller terminates supply of the hydrocarbon fuel and the oxidant to the anode side. The controller terminates supply of the hydrocarbon fuel to the cathode side, and supplies a hydrogen-containing feed to the anode side.

5 Claims, 8 Drawing Sheets

FUEL CELL STACK PREHEATING

FIELD OF THE INVENTION

The present invention relates to fuel cell stacks, and more particularly to systems and methods for warming up a fuel cell stack to a threshold temperature.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

For optimum operation, defined as high power output and quick power delivery, fuel cells need a certain operating temperature. Heat generated through the electrochemical reaction increases the operating temperature of the fuel cell. Excess heat is dissipated through a cooling system.

At sub-freezing temperatures (e.g. below 0° C.), however, starting the fuel cell quickly is more difficult due to frozen water in the fuel cell and the fact that the electrochemical reaction rate in the fuel cell is significantly reduced. This limits current flow and further heating of the fuel cell to the optimum operating temperature.

SUMMARY OF THE INVENTION

The present invention provides a fuel cell system that includes a fuel cell and a controller. The controller controls a hydrocarbon fuel supply to an anode side and a cathode side of the fuel cell. The controller controls an oxidant supply to the anode and cathode sides to exothermically react with the hydrocarbon fuel when a temperature of the fuel cell is below a threshold temperature. When the temperature is greater than the threshold temperature, the controller terminates supply of the hydrocarbon fuel and the oxidant to the anode side. The controller terminates supply of the hydrocarbon fuel to the cathode side, and supplies a hydrogen-containing feed to the anode side.

In one feature, the threshold temperature is between 0° C. and 80° C.

In other features, the hydrocarbon fuel can be methanol or methane. The hydrogen-containing feed can be gaseous hydrogen produced by reforming the hydrocarbon fuel and the oxidant can be oxygen.

In still another feature, the controller supplies a sufficient molar ratios of the hydrocarbon fuel at the anode and cathode sides to the oxidant at the anode and cathode sides to produce heat and electrical energy from the fuel cell when the fuel cell is less than the threshold temperature.

In yet another feature, the controller supplies a sufficient molar ratio of the hydrocarbon fuel at the anode and cathode sides to the oxidant at the anode and cathode sides to produce heat energy without producing electrical energy from the fuel cell when the fuel cell is less than the threshold temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements.

Figure 1:
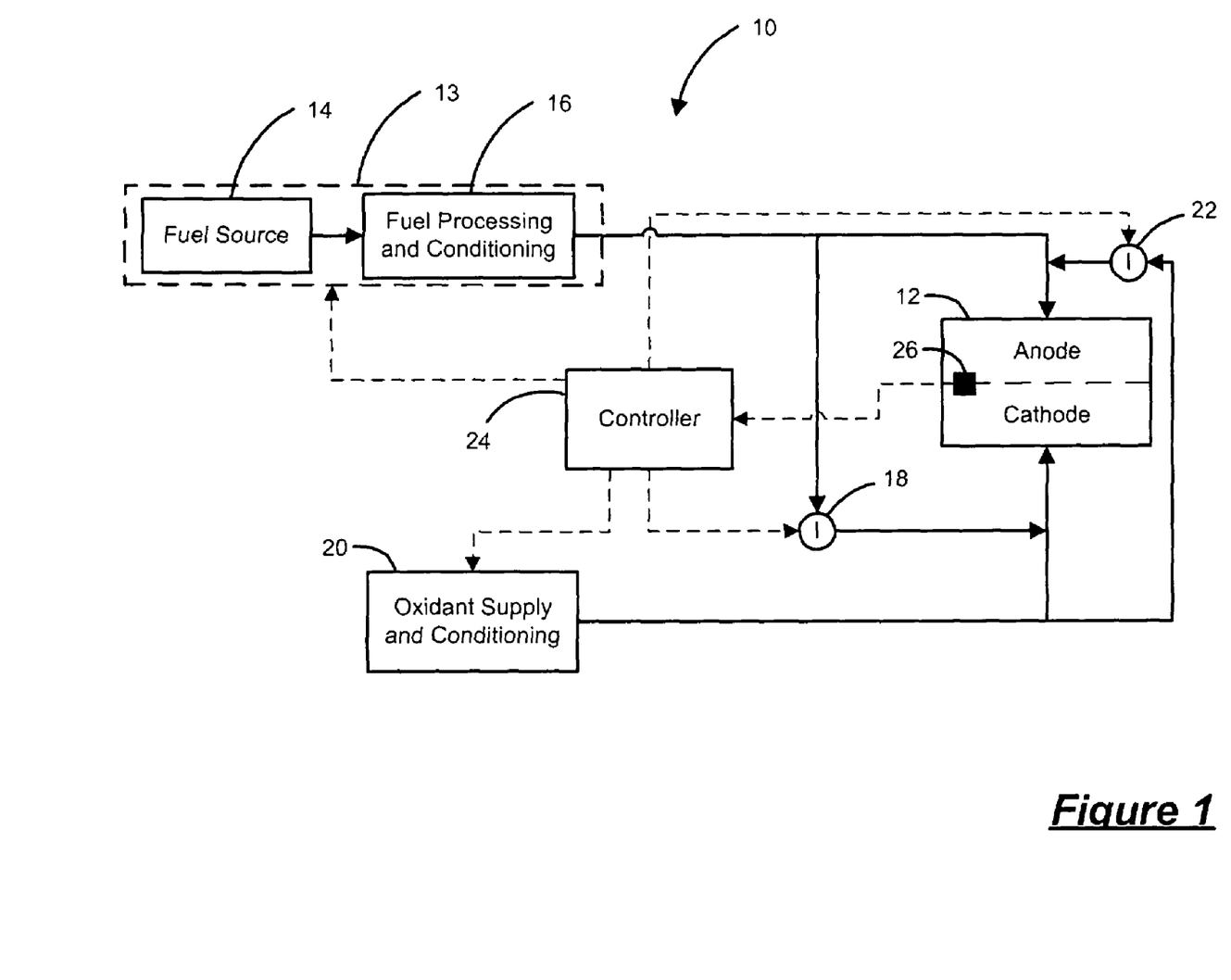
FIG. 1 is a functional block diagram of an exemplary fuel cell system according to the present invention.

Referring now to FIG. 1, an exemplary fuel cell system 10 is shown and includes a fuel cell stack 12. The fuel cell system 10 includes a fuel supply and conditioning sub-system (fuel sub-system) 13 that provides the fuel to the anode side of the fuel cell stack 12 at an appropriate pressure, temperature, humidity and mass flow. To enable appropriate fuel supply, the fuel sub-system 13 includes mechanical and electrical control devices (not shown) such as valves, sensors, metering devices, compressors and injectors. The fuel sub-system 13 includes a fuel source 14 that provides fuel and a fuel processing and conditioning unit 16. The fuel is selectively supplied to the cathode side of the fuel cell stack 12 through an injector 18. Example fuels include hydrogen, methane, methanol, gasoline or other hydrocarbon fuels. A fuel processor 16 catalytically dissociates the hydrocarbon fuel into a hydrogen-rich reformate or hydrogen-containing feed that includes $H_2$, $CO_2$, $H_2O$, and $CO$. However, in the case of the fuel being pure hydrogen, such a processor is not required and the hydrogen-containing feed includes $H_2$.

Oxidant is supplied to the fuel cell stack 12 to catalytically react with the hydrogen-containing feed. To that end, the fuel cell system 10 includes an oxidant supply and conditioning sub-system (oxidant sub-system) 20 that provides the oxidant to the cathode side of the fuel cell stack 12 at an appropriate pressure, temperature, humidity and mass flow. To enable appropriate oxidant supply, the oxidant sub-system 20 includes mechanical and electrical control devices (not shown) such as valves, sensors, metering devices, compressors and injectors. The oxidant is typically air supplied by a compressor. Other oxidants may be used including, but not limited to, pure oxygen and peroxide ($H_2O_2$) in liquid or vapor form. The oxidant is selectively supplied to the anode side of the fuel cell stack 12 through an injector 22.

A controller 24 controls the operating mode of the fuel cell system 10. During the normal operating mode of the fuel cell system 12 the controller 24 communicates with the fuel sub-system 13 and the oxidant sub-system 20 to supply the hydrogen-containing feed to the anode side of the fuel cell stack 12 and oxidant to the cathode side of the fuel cell stack 12. During a warm-up mode, a mixture of hydrogen-containing feed and/or oxidant is supplied to the anode side of the fuel cell stack 12 as well as a mixture of oxidant and/or hydrogen-containing feed being supplied to the cathode side of the fuel cell stack 12. The oxidant and fuel mixture induces an exothermic reaction that accelerates warm-up of the fuel cell stack 12.

The controller 24 differentiates between the operating modes of the fuel cell stack 12 by monitoring a signal of a temperature sensor 26. The normal operating mode occurs when the operating temperature of the fuel cell stack 12 is above a certain threshold. In this case the controller 24 communicates with the fuel sub-system 13 to control the flow of fuel to the anode side of the fuel cell stack 12. The controller 24 communicates with the oxidant sub-system 20 to control the oxidant flow to the cathode side of the fuel cell stack 12. The warm-up mode occurs when the temperature of the fuel cell stack 12 is below a certain threshold. The controller 24 communicates with the injector 18 to control the flow of the hydrogen-containing feed into the cathode side of the fuel cell stack 12. The controller 24 communicates with the injector 22 to control the supply of oxidant to the anode side of the fuel cell stack 12. The controller 24 communicates with the fuel sub-system 13 to control the supply of the hydrogen-containing feed to the anode side of the fuel cell stack 12 as well as with the oxidant sub-system 20 to control the supply of oxidant to the cathode side of the fuel cell stack 12.

Figure 2A:
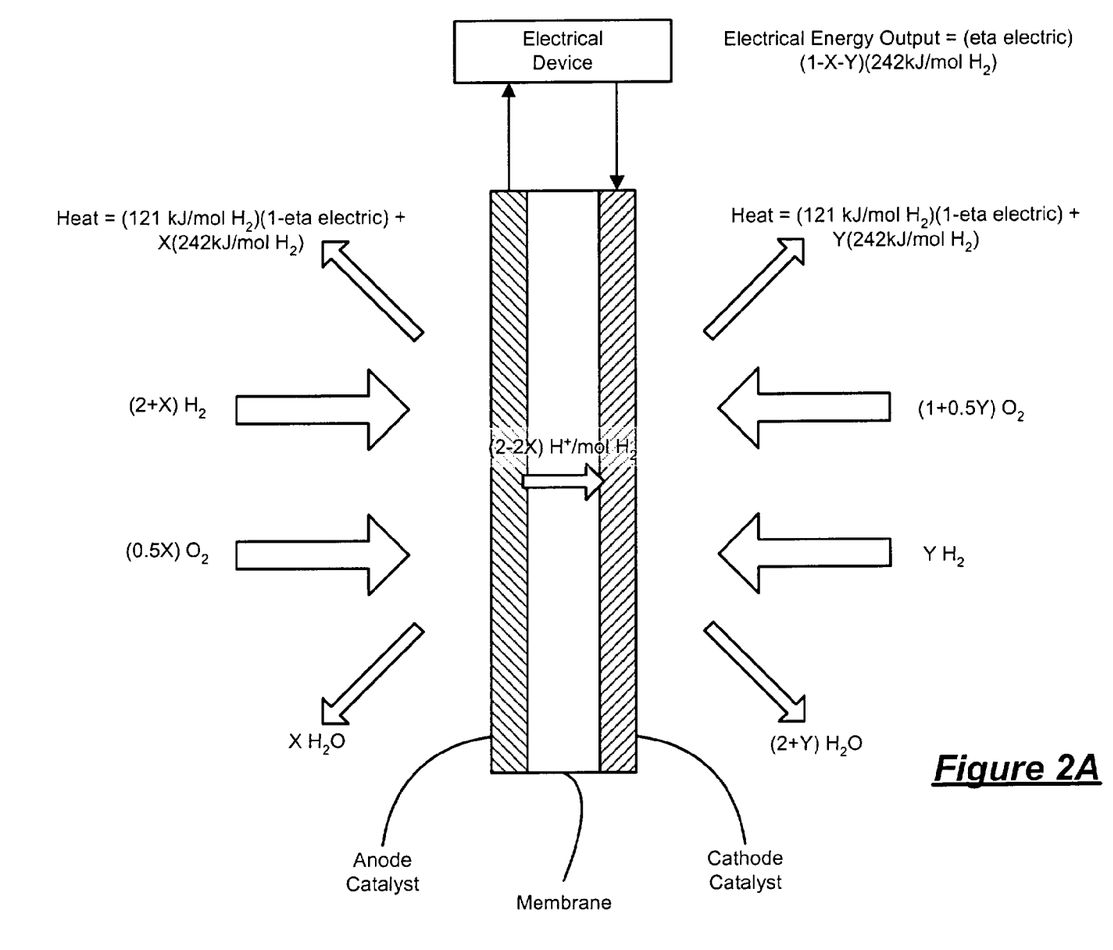
FIG. 2A illustrates the electrochemical reaction on a stoichiometric basis at the anode and cathode side of a membrane electrode assembly (MEA) with electrical load for a hydrogen-based fuel cell system.
Figure 2B:
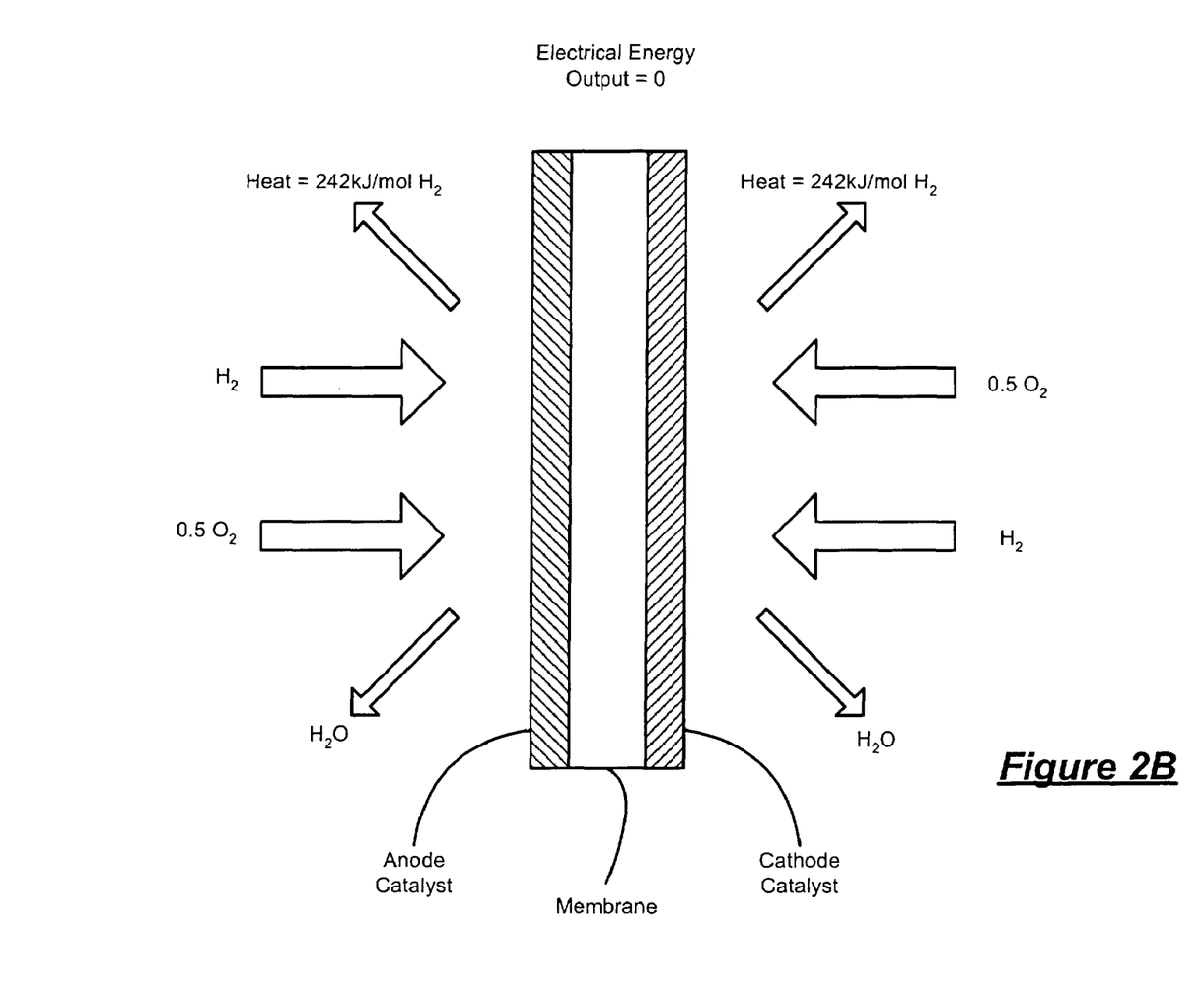
FIG. 2B illustrates the described exothermic warm-up process without electrical load for a hydrogen-based fuel cell system.

Referring now to FIGS. 2A and 2B, both the hydrogen-containing feed and the oxidant are supplied to both the anode and cathode sides during the warm-up period. The injector 18 adjusts the flow of the hydrogen-containing feed into the cathode side. The injector 22 adjusts the flow of the oxidant into the anode side. An exothermic reaction occurs at both the anode and cathode sides when the hydrogen-containing feed and oxidant mixture contacts anode and cathode catalysts. Heat generated by the exothermic reaction heats the fuel cell stack 12. Once the fuel cell stack 12 is at a temperature greater than the upper threshold temperature, the fuel cell stack 12 can be switched to normal operation. This can be a gradual process that is achieved by gradually lowering the concentrations of the hydrogen-containing feed in the cathode and oxidant in the anode to zero. However, it is preferred that the fuel cell stack 12 achieves an operational temperature or threshold temperature prior to switching to normal operation.

An exemplary threshold temperature is 0° C. An exemplary upper threshold temperature is 20° C., where sufficient current is immediately available from the fuel cell stack 12 to propel a vehicle. In the event that the temperature of the fuel cell stack 12 drops below the threshold temperature, the injectors 18,22 can respectively supply the hydrogen-containing feed to the cathode side and oxidant to the anode side in order to again warm the fuel cell stack 12.

The injectors 18,22 can be regulated to respectively adjust the molar ratios of the hydrogen-containing feed and the oxidant on the anode side and cathode side of the fuel cell stack 12. The molar ratio of the hydrogen-containing feed to the oxidant can exceed corresponding lower ignition limits because there are no ignition sources in either the anode or cathode sides. Further, the pressures within the anode and cathode sides are insufficient to induce auto-ignition. During the warm-up mode, it is possible to generate current to power an electrical load. As seen in FIG. 2A, the molar ratios are sufficient to enable the production of both power and heat during the warm-up period. As seen in FIG. 2B, the molar ratios are insufficient to produce power during the warm-up period.

The relative quantities of the hydrogen-containing feed and oxidant are based on X and Y factors for the anode and cathode sides, respectively. The factors X and Y respectively depict the molar relationship between the amount of fuel being supplied to the cathode side of the fuel cell stack 12 and the amount of oxidant being supplied to the anode side of the fuel cell stack 12 to the amount of excess oxidant and fuel required for the exothermal reaction as well as the resulting heat and water.

Referring back to FIG. 1, once the fuel cell stack 12 achieves the upper threshold temperature, the fuel cell system 10 switches to normal operation. The valve 18 is closed to prohibit the flow of the fuel into the cathode side. The valve 22 is closed to prohibit the flow of oxidant into the anode side of the fuel cell stack 12. The controller 24 controls the fuel sub-system 13 and the oxidant sub-system 20 to supply the anode side of the fuel cell stack 12 with the hydrogen-containing feed and the cathode side of the fuel cell stack 12 with the oxidant.

Figure 3:
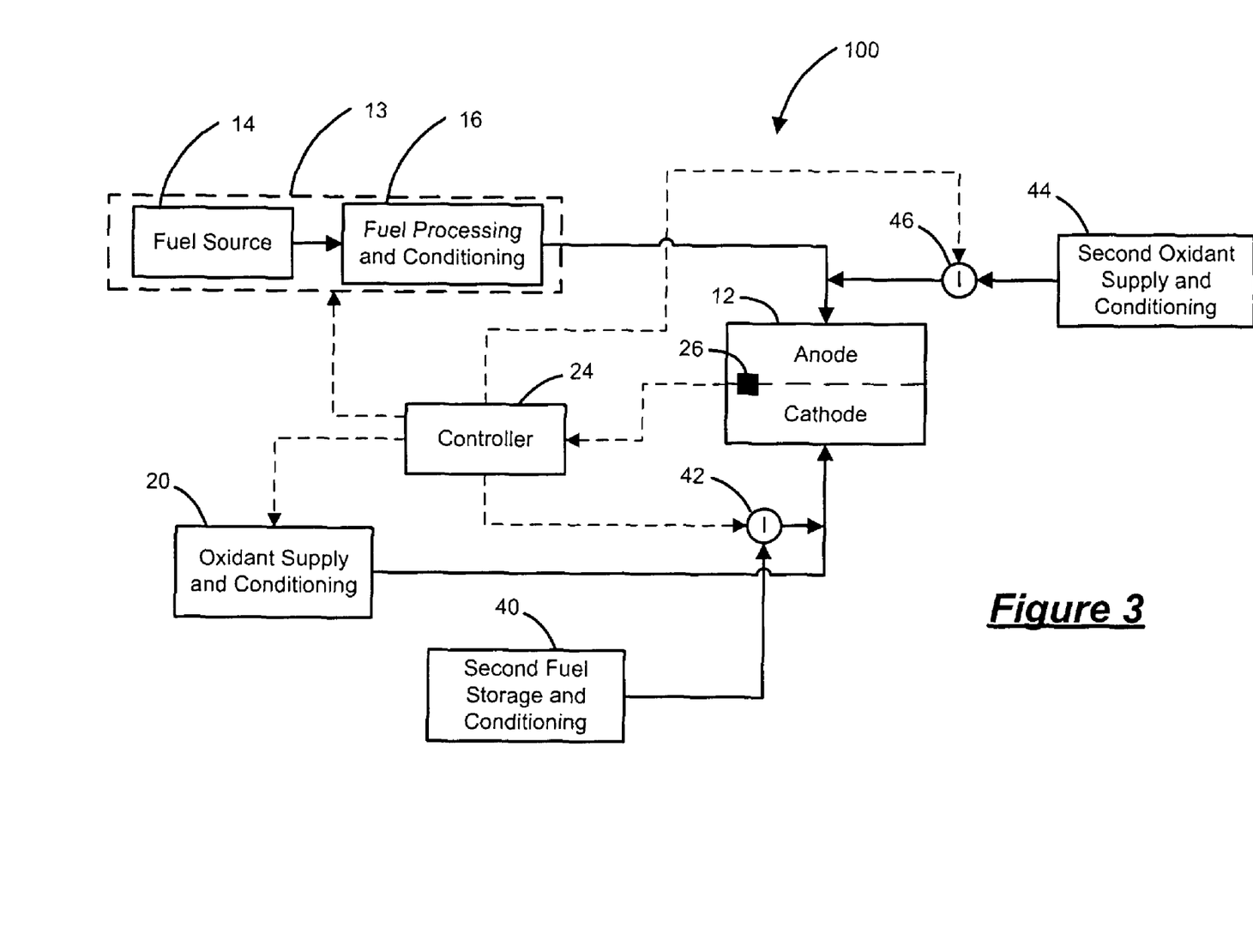
FIG. 3 is a functional block diagram of an exemplary fuel cell system based on two types of different fuel and oxidant supplies according to the present invention.

Referring now to FIG. 3, another exemplary fuel cell system 100 is shown. Similar to the fuel cell system 10 described above, the fuel cell system 100 includes the fuel cell stack 12, the fuel sub-system 13 including the fuel source 14 and the fuel processor 16, the oxidant sub-system 20, the controller 24 and the temperature sensor 26. The fuel cell system 100 further includes a second fuel sub-system 40 and an injector 42 that adjusts the flow of the hydrocarbon fuel from the second fuel sub-system 40 into the anode side. The hydrocarbon fuel from the second fuel sub-system 40 is different than that supplied by the fuel sub-system 13. The fuel supplied from the second fuel source includes methanol or methane. It will be appreciated, however, that the fuel supplied from the second fuel sub-system 40 is not limited to methanol and methane. The fuel cell system 100 also includes a second oxidant sub-system 44 and an injector 46 that adjusts the supply of the second oxidant to the cathode side. The controller 24 communicates with the temperature sensor 26 and injectors 42,46 to control the operating mode of the fuel cell system 100.

The second fuel sub-system 40 and second oxidant sub-system 44 are used during the warm-up operating mode of the fuel cell system 100. The normal operating mode of the fuel cell system 100 is similar to that described previously for the fuel cell system 10. However, during the warm-up mode, when the fuel cell stack temperature is below the threshold, the controller 24 controls supply of oxidant from the second oxidant sub-system 44 to the anode side and controls supply of fuel from the second fuel sub-system 40 to the cathode side. The oxidant from the second oxidant sub-system 44 mixes with the hydrogen-containing feed from the fuel sub-system 13. The fuel from the second fuel sub-system 40 mixes with the oxidant from the oxidant sub-system 20. As described above, an exothermic reaction occurs at both the anode and cathode sides as the mixtures contact the anode and cathode catalysts. Once the temperature rises above the threshold the fuel cell system 100 switches to normal operation.

Figure 4A:
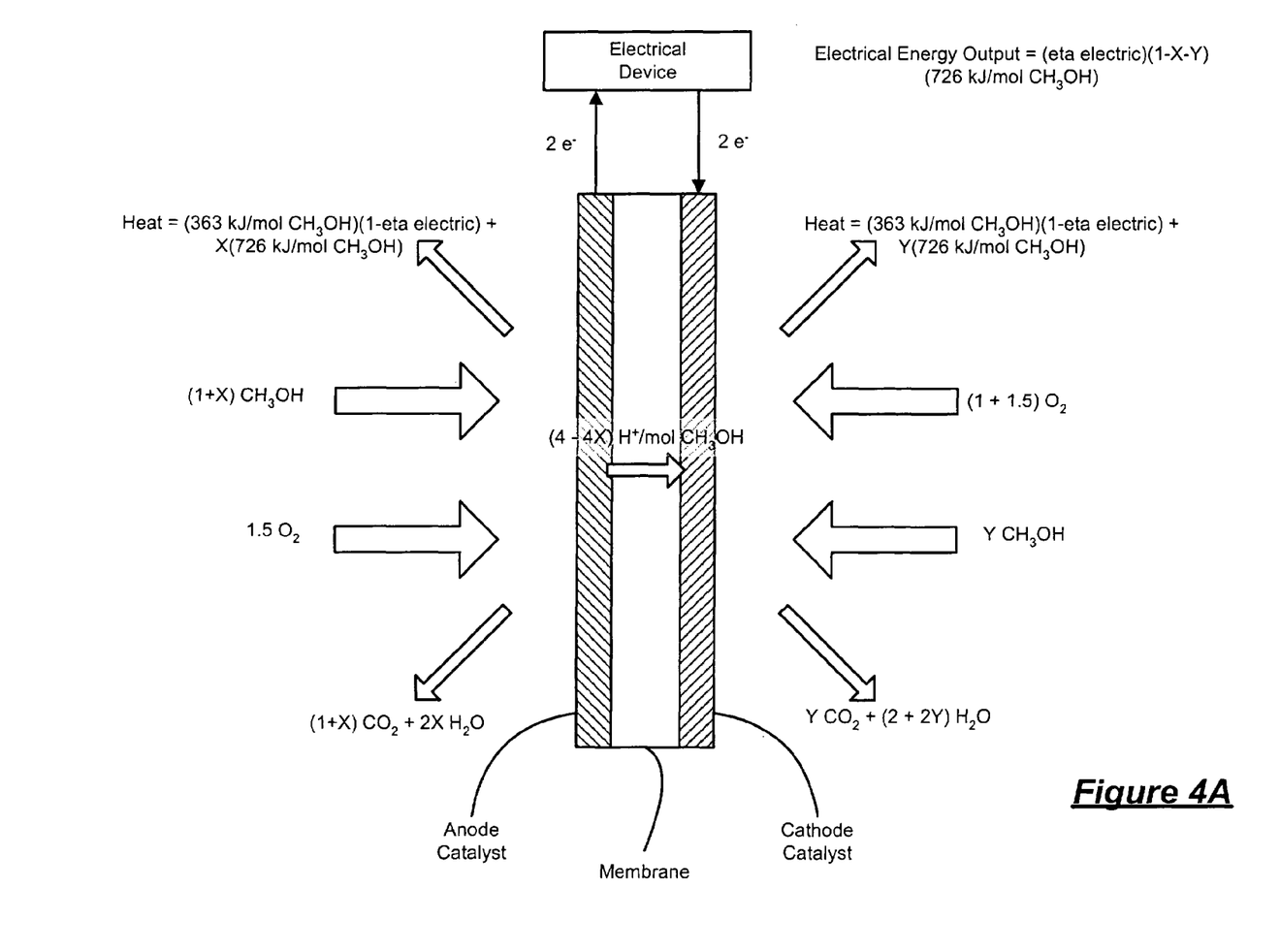
FIG. 4A illustrates the electrochemical reaction on a stoichiometric basis at the anode and cathode side of a membrane electrode assembly (MEA) with electrical load for a methanol-based fuel cell system.
Figure 4B:
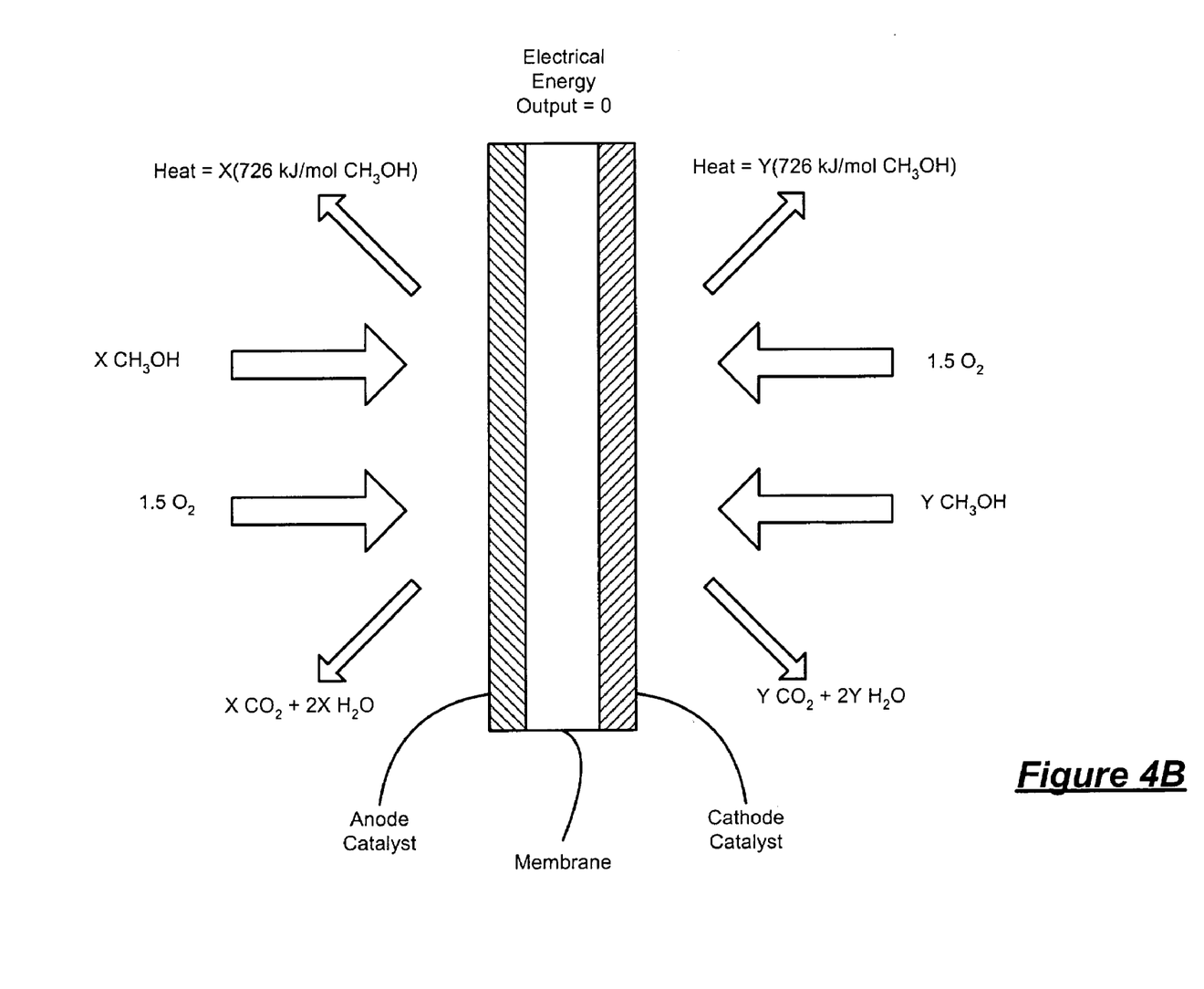
FIG. 4B illustrates the described exothermic warm-up process without electrical load for a for a methanol-based fuel cell system.
Figure 5A:
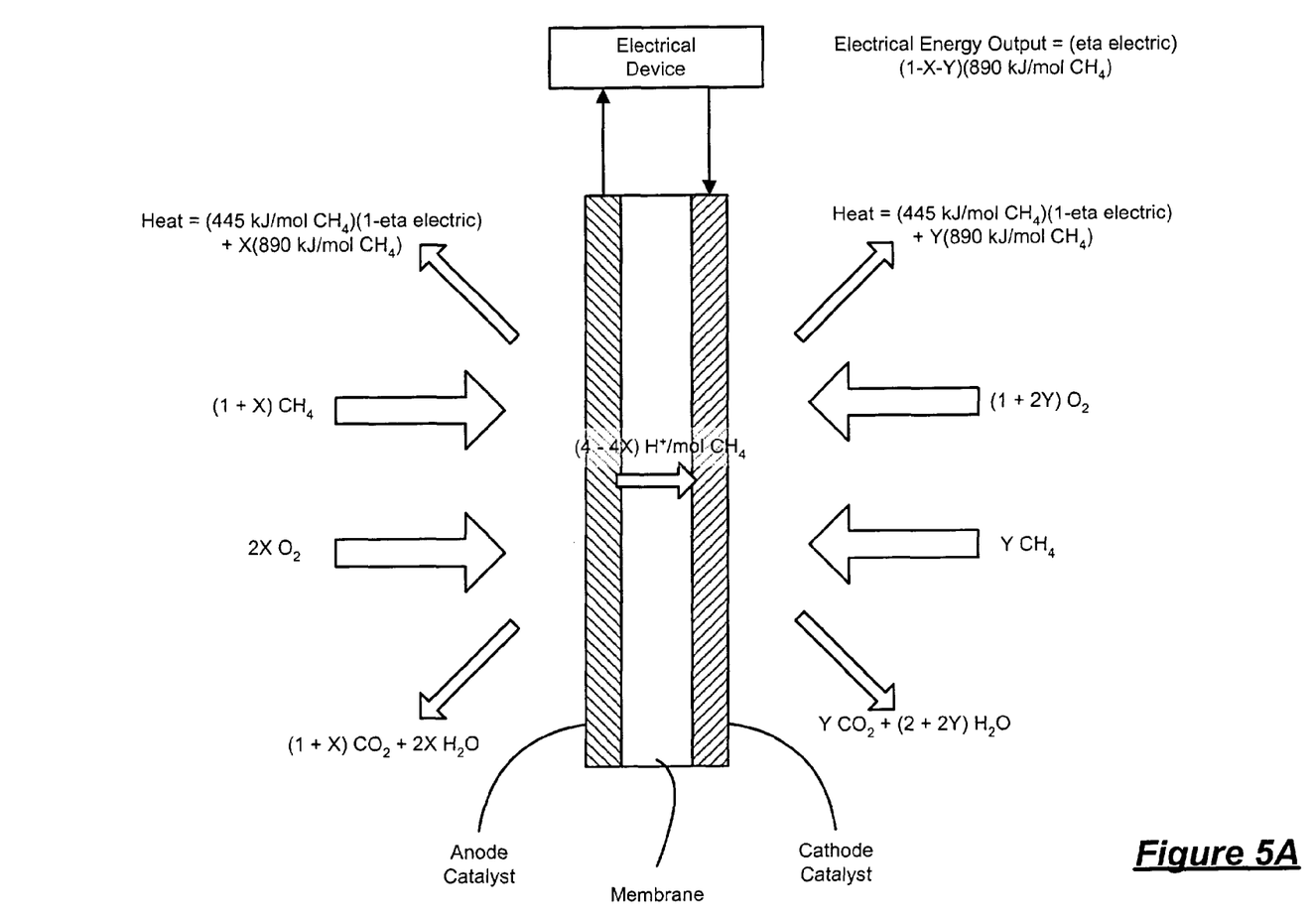
FIG. 5A illustrates the electrochemical reaction on a stoichiometric basis at the anode and cathode side of a membrane electrode assembly (MEA) with electrical load for a methane-based fuel cell system.
Figure 5B:
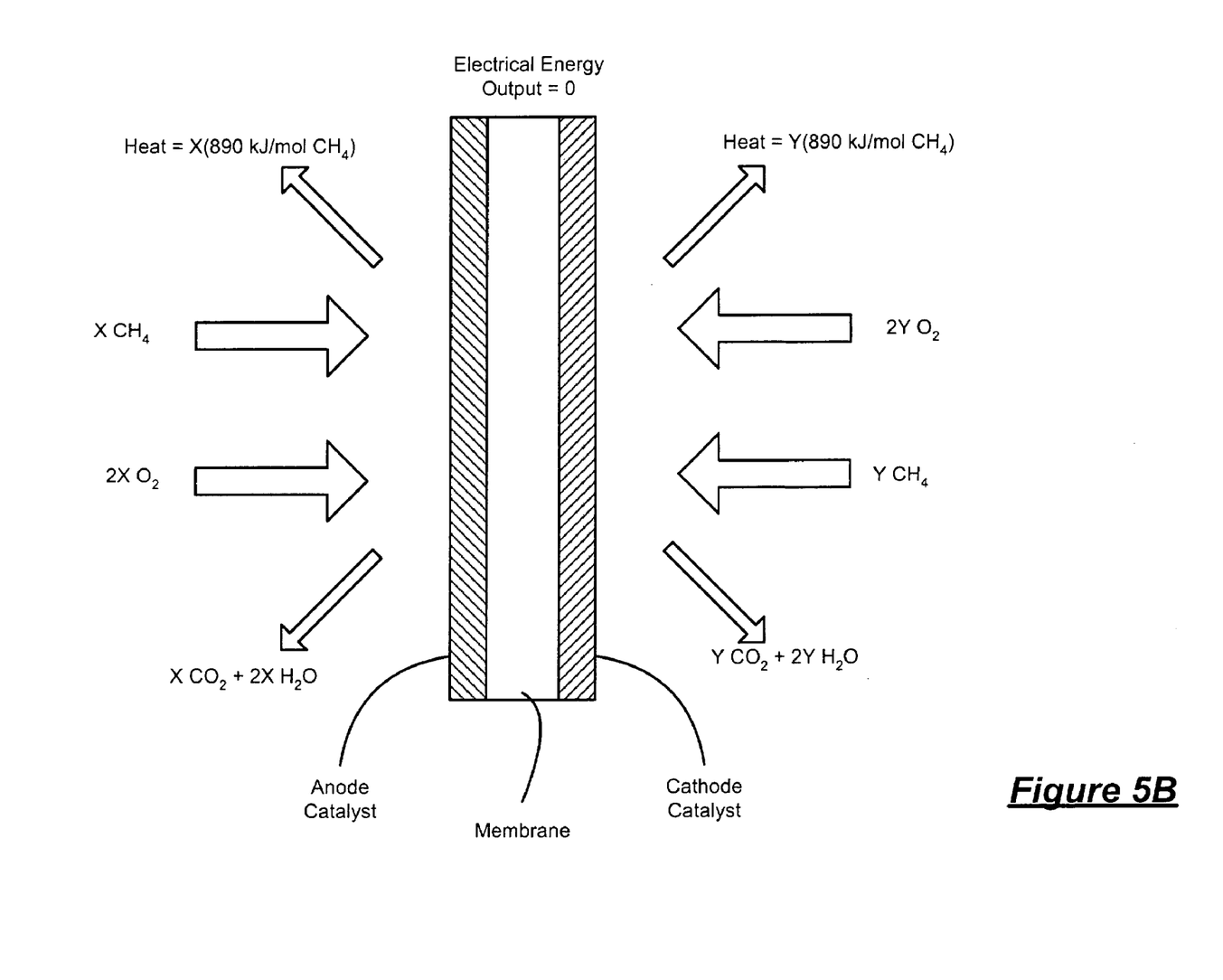
FIG. 5B illustrates the described exothermic warm-up process without electrical load for a methane-based fuel cell system.

As seen in FIG. 4A, the fuel supplied from the second fuel sub-system 40 is methanol ($CH_3OH$) and the molar ratios are sufficient to enable the production of both electrical energy and heat energy during the warm-up period. As seen in FIG. 4B, the molar ratios are insufficient to produce electrical energy during the warm-up period. As seen in FIG. 5A, the fuel is methane ($CH_4$) and the molar ratios are sufficient to enable the production of both electrical energy and heat energy during the warm-up period. As seen in FIG. 5B, the molar ratios are insufficient to produce electrical energy during the warm-up period. The molar ratio of the fuel to the oxidant can exceed the corresponding lower ignition limits because there are no ignition sources in either the anode or cathode sides and pressures are not sufficient to induce auto-ignition. As described above, the relative quantities of fuel and oxidant are based on the factors X and Y for the anode and cathode sides, respectively.

Referring again to FIG. 3, once the fuel cell stack 12 achieves the threshold temperature, the fuel cell system 100 switches to normal operation. The injector 42 is closed to prohibit flow of the fuel into the cathode side of the fuel cell stack 12. The fuel sub-system 13 is controlled to enable normal flow of the hydrogen-containing feed into the anode side. The injector 46 is closed to prohibit flow of the oxidant into the anode side of the fuel cell stack 12. The oxidant sub-system 20 is controlled to enable normal flow of the oxidant into the cathode side.

Alternatively, however, the fuel cell system 100 can be powered directly by the fuel during normal operation to avoid the need for the hydrogen-containing feed. For example, the fuel cell stack 12 can be either a direct methanol fuel cell (DMFC) stack, in the case of methanol, or a solid oxide fuel cell (SOFC) stack, in the case of methane.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of operating a fuel cell, comprising:
    supplying a first hydrogen-containing feed having a first molar ratio to anode oxidant from a first fuel source to an anode side and a second hydrogen-containing feed having a second molar ratio to cathode oxidant from a second fuel source to a cathode side of said fuel cell, wherein at least one of the first and second molar ratios is sufficient to produce electrical energy and heat energy below a threshold temperature;
    supplying a first oxidant to said anode side and a second oxidant to said cathode side to exothermically react with said first and second hydrogen-containing feeds; and
    terminating supply of said second hydrogen-containing feed to said cathode side and said first oxidant to said anode side when said fuel cell achieves said threshold temperature, wherein the first fuel source stores a first fuel type and the second fuel source stores a second fuel type that is different from the first fuel type wherein at least one of said first and second hydrogen-containing feeds is at least one of a group consisting of methane and methanol.

2. The method of claim 1 wherein said threshold temperature is between 20° C. and 80° C.

3. The method of claim 1 wherein at least one of said first and second hydrogen-containing feeds is gaseous hydrogen.

4. The method of claim 1 wherein at least one of said first and second hydrogen-containing feeds is a hydrogen-rich reformate produced by reforming a hydrocarbon fuel.

5. The method of claim 1 wherein at least one of said first and second oxidants is oxygen.

* * * * *